Dec. 26, 1950 P. C. DAUGERT 2,535,393
THERAPEUTIC LAMP AND BAKER
Filed Feb. 24, 1948 2 Sheets-Sheet 1

Inventor
P. C. Daugert

By Mason, Fenwick & Lawrence
Attorneys

Dec. 26, 1950     P. C. DAUGERT     2,535,393
THERAPEUTIC LAMP AND BAKER
Filed Feb. 24, 1948     2 Sheets-Sheet 2

Inventor
P. C. Daugert
By Mason, Fenwick & Lawrence
Attorneys

Patented Dec. 26, 1950

2,535,393

UNITED STATES PATENT OFFICE 2,535,393

THERAPEUTIC LAMP AND BAKER

Peter Charles Daugert, Wilkes-Barre, Pa., assignor to Infra Appliances Corporation, Wilkes-Barre, Pa., a corporation of Delaware Application February 24, 1948, Serial No. 10,389

1 Claim. (Cl. 219—34)

The present invention relates in general to adjustable radiant heat sources, and more particularly to large area therapeutic heating sources adjustable to be shaped in substantial conformity with the contours of the portion of a human body to which the heat is to be applied.

In the application of artificial heat to various portions of the human body for therapeutic treatment, many heating sources of either the point source directional heating type or of the area heating type adapted to distribute heat substantially uniformly over a large area, have been developed. It is particularly desirable in many cases in which therapeutic heating treatments are employed, however, especially when the area to be treated occurs over extended irregular portions or limbs of the body, that a broad area of substantially uniform heating be available, the source of such heat being deformable to substantially correspond to the contours of the portion of the body to be treated, to bring all portions of the area of the heating source immediately adjacent the body to be heated, in order to achieve maximum heating efficiency from the source, to facilitate the penetration of the radiant heat internally of the body, and to approximate uniform heat distribution over the incident surface of the body to be heated.

Accordingly, an object of the present invention is the provision of a novel radiant heat source capable of being deformed to dispose the effective heat radiating area of the heat source substantially equal spaced from the surface of the body to be heated.

Another object of the present invention is the provision of a novel radiant heat source adapted to be suspended adjacent the body to be heated and uniformly distribute radiant heat over the incident surface of the body to be heated over the total area to be treated.

Another object of the present invention is the provision of a novel therapeutic heating device adapted to radiate heat uniformly from a large area radiating surface and capable of being readily deformed to substantially conform to the contours of the incident surface of the body to be heated and maintained in such deformed condition until manually readjusted.

Other objects, advantages and capabilities of the invention will become apparent from the following description, taken in conjunction with the accompanying drawings, showing only preferred embodiments of the invention.

Figure 1:
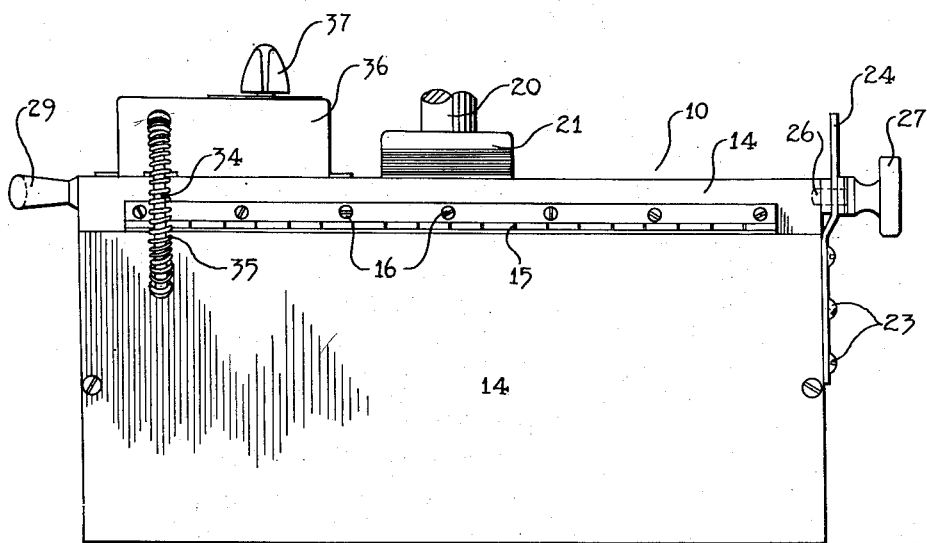
Figure 1 is an end elevation of one preferred form of therapeutic heating source embodying the present invention, adapted to be suspended from an ancillary support.
Figure 2:
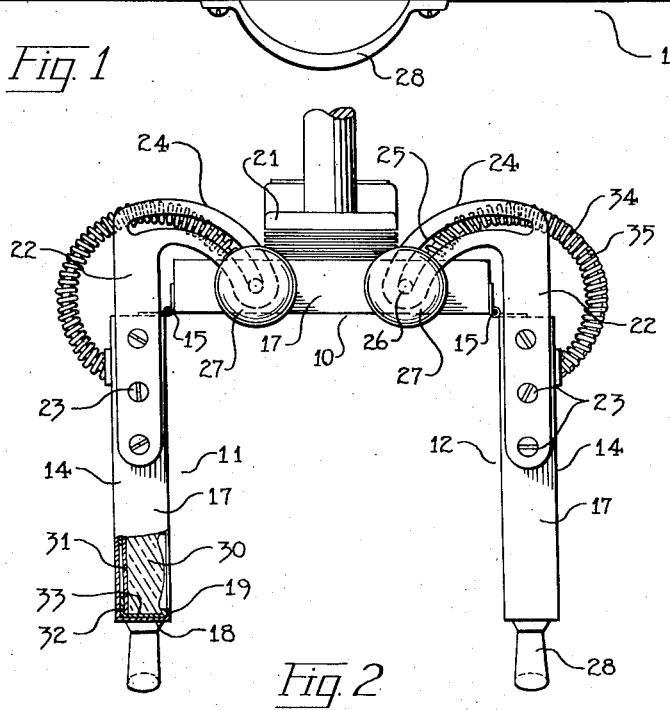
Figure 2 is a side elevation of the embodiment illustrated in Figure 1.

Referring now to the drawings, in which like reference characters designate corresponding parts throughout the several figures, and particularly to Figures 1 and 2, the radiant heating source or oven is formed of a central section indicated at 10, and lateral sections 11 and 12 pivotally secured to the central section 10 for angular adjustment relative thereto. Each of these sections 10, 11 and 12, is formed of a casing 14 constructed of sheet metal or other convenient material shaped to form a substantially rectangular receptacle opening inwardly of the sections, each of the lateral sections 11 and 12 being coupled along their inner ends to the central section casing by means of hinge members 15 secured as by screws 16 to the sides 17 of the casings 14 of the central and lateral sections. The sides 17 and lower ends 18 of the casing 14 are turned inwardly at right angles thereto to provide flanges or lips 19 forming a frame for the open side of the casing.

The radiant heating source is designed to be positioned facing normally downward with the central portion 10 lying substantially in a horizontal plane, when suspended from an adjustable supporting stand or other suitable support, indicated at 20, with a mounting head 21 or other convenient coupling device selectively coupled to the upper surface of the casing 14 of the central section 10, substantially aligned with its directional axis as by mounting screws or bolts, the lateral sections 11 and 12 being angularly adjustable relative to the central section 10.

The adjusting mechanism for the lateral sections 11 and 12 comprises a pair of coupling arms 22, fixedly mounted along the sides 17 of the casings 14 of the sections 11 and 12 by screws or bolts 23 and extending longitudinally of the sides 17 above the sections 11 and 12. These coupling arms 22 are provided with angular sectors 24 disposed inwardly of the sections to which they are secured, having arcuate slots 25 therein formed with their centers coinciding with the axes of the hinge members 15 and extending over 90° of arc, the arcuate slots 25 receiving therethrough threaded clamping bolts 26 having a manual control knob 27 mounted thereon and adapted to be screwed into threaded apertures in the sides of the casing of the central section 10. In this manner the lateral heater sections 11 and 12 may be manually adjusted to occupy desired angular relations with the central heater section 10 and rigidly clamped in such adjusted position by threading the clamping bolt 26 into its associated aperture to clamp the arcuate arm of the coupling arm 22 between the inner shoulder of the knob 27 on the clamping bolt 26 and a side of the central section casing To aid in the manual adjustment of the lateral sections 11 and 12, handle members 28 are provided on the lower ends thereof, and a handle member 29 is secured to one of the sides of the casing, of the central heater section 10 to aid in the adjustment of the whole radiant heater unit relative to a stand or support on which it is mounted.

By the above described adjusting mechanism, the lateral heater sections 11 and 12 can be angularly adjusted to fit substantially about limbs of the human body to be uniformly subjected to the heating treatment, bringing the inner surface of the heater sections substantially uniformly spaced from the incident surface of the limb, or they may be opened outwardly into the same plane, forming a broad planar heating surface to adapt the heating device to broader expanses of incident surface to receive the radiated heat.

Within the casing 14 of each heater section the heating elements are disposed, comprising rectangular glass plates 30 having a suitable metallic conductor indicated at 31 of high infra red heat radiation characteristics sprayed in elemental form on the rearwardly disposed surface of the glass plates 30, the glass making up the plates 30 being of the known types readily transmitting the long wave length components of the infra red spectrum and attenuating the shorter wave length components. The plates 30 are mounted side by side in the same plane to substantially fill the area between the sides of the casing 14 between the frame-forming flanges or lips 19 and the rear surface of the casing 14. Each of the glass plates 30 is encased in metallic frames 32 covering the sides and rear surface of the glass plates 30 and insulated from the glass by suitable insulating material such as asbestocel or other commercially marketed insulating fibers.

These laterally disposed glass plate heating units 30 are intercoupled in series electrically by means of metallic wire conductors soldered to the sprayed conductor on the back surface of the glass plates 30 by means of a high melting point solder, and the glass plates 30 in the lateral heating sections 11 and 12 intercoupled with these in the central section 10 through an insulation covered conductor 34 extending between the heating sections and surrounded with a metallic or plastic spiral coil 35 externally of the casings 14 to prevent the interconnecting conductor 34 from becoming fouled with the hinged sides of the casing of the lateral and central sections on adjustment of the lateral sections.

A thermal control thermostat indicated at 36, is mounted upon the upper surface of the casing of the central section 10, provided with a manually adjustable control knob 37 to permit manual selection of a plurality of temperature settings of the thermostat 36, the thermostat 36 being coupled in series in the supply circuit of the heater conductors 31 on the glass plates 30 to maintain the temperature radiated by the heater units substantially constant by regulating the current supplied therethrough.

To operate the device to effect uniform heating of the incident surface of the limb or body to be heated, the therapeutic oven with the lateral sections 11 and 12 adjusted to lie in the same plane as that of the central section 10, is brought into a position on the support from which it is to be suspended to place the inner surface of central section 10 substantially adjacent and centered on the limb or body portion to be treated, the knobs 27 of the clamping bolts 26 turned to release the coupling arms 22 from clamped relation, and the lateral sections 11 and 12 rotated about the hinges 15 to position the inner surfaces of the glass plates 30 of the heating sources, likewise substantially adjacent the portions of the incident surface of the body to be treated, at substantially the same distance therefrom as the surface of the central section 10. The clamping bolts 26 are again turned to clamp the coupling arms 22 in their newly adjusted position against the sides of the central section 10. Constant automatic control of the heat radiated by the therapeutic oven is effected by the thermostat control unit 36, the desired degree of heat being selected by setting the thermostat control knob 37.

Figure 3:
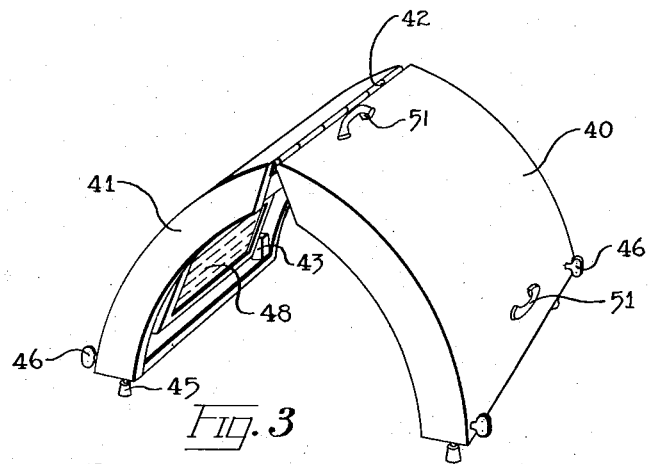
Figure 3 is a perspective view of a second embodiment of the invention adapted to be disposed in upright position on a planar supporting surface.
Figure 4:
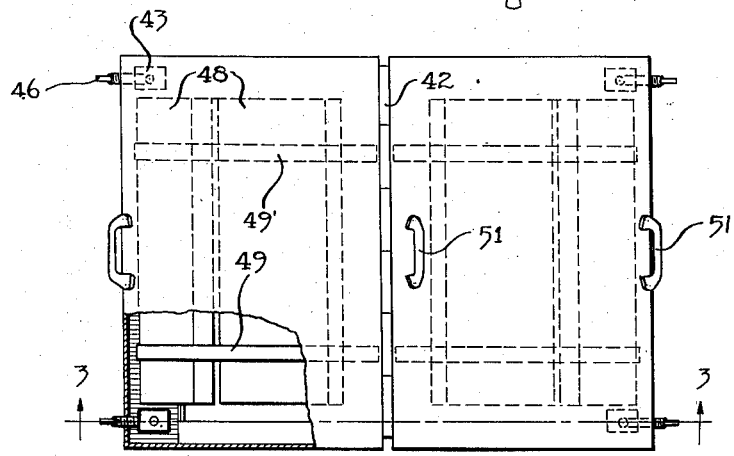
Figure 4 is a top view of the embodiment of the invention illustrated in Figure 3, shown with parts of the incident surface of the casing removed to expose internal components.
Figure 5:
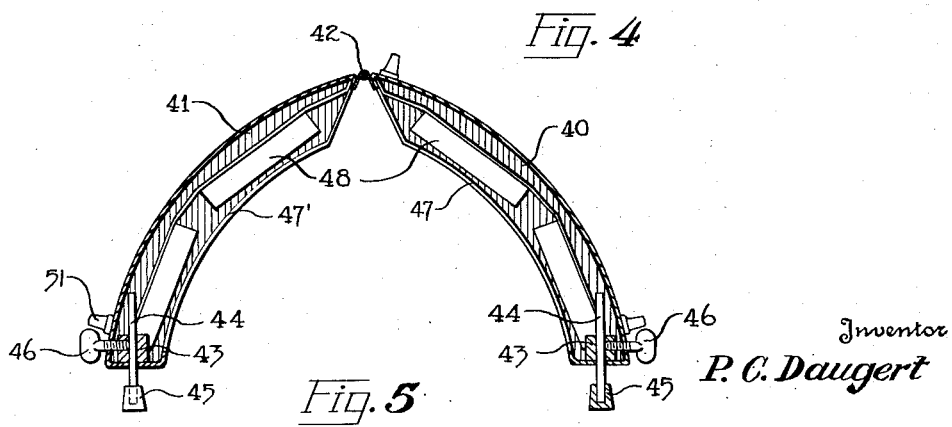
Figure 5 is a vertical transverse section of the embodiment of the invention shown in Figure 3, taken along the line 3—3 of Figure 4.

Referring now to Figures 3, 4 and 5, showing an alternate species of the invention, adapted to be adjusted about a limb of the body desired to be treated by radiant heat while resting on a planar supporting surface, two arcuate sectors 40, 41 form the casing for the heating oven, the two arcuate sectors 40, 41 being hinged together along one edge thereof by hinge members 42 to permit the two sectors 40, 41 to be angularly adjusted relative to each other to surround a portion of the limb to be treated. Disposed at the lower corner of each sector 40, 41 is a mounting block 43, having an aperture therethrough adapted to receive the stem 44 of an adjustable height leg member 45, each of the mounting blocks 43 having a threaded opening therein extending at right angles to and communicating with the aperture for the stem 44, adapted to receive threaded set screw members 46 therein to extend outwardly of the sector casings 40, 41 to clamp the legs 45 at any desired position of adjustment.

The inner or adjacent surfaces of the casings forming the arcuate sectors 40, 41 are open, as indicated at 47, 47', and glass plate heating elements 48, of the kind described in connection with the previous embodiment of the present invention, mounted within the sector casings 40, 41. To securely mount the glass plate heating elements 48 within the casings, metallic strips 49, 49' bent at spaced points along the length thereof to correspond roughly with the curve of the arcuate sectors, are secured at the lower and upper corners of the casings 40 and 41, as by brazing or welding, laterally of the mounting strips 49, 49' forming a frame support upon which the heating elements 48 are secured facing inwardly of the sector casings 40 and 41. For convenience in handling and adjusting the heating oven, handle members 51 are provided on the outer surface of the casings near the hinged end and the lower ends thereof.

To condition the device forming the second embodiment of the invention to the limb or other portion of the body to be treated, the body is disposed on a horizontal supporting plane, and the arcuate sections 40 and 41 of the casing lowered over the limb with the arcuate sections adjusted at an angle to provide a spacing at the lower ends of the sections 40 and 41 greater than the diameter of the limb, until the legs 45 are resting on the horizontal surface. The legs 45 are then adjusted as to height by the set screw 46 and positioning the stem 44 of each leg in the block 43 until the inner surfaces of the casing sections 40 and 41 and of the glass plates of the radiant heating elements 48, are disposed substantially equidistant from the incident surface of the limb to be treated, thus providing uniform radiation to all portions of the incident surface of the area of the limb.

It will be apparent that a novel device is provided, characterised by simplicity of construction and maintenance, ease in handling, positioning and carrying, and capable of providing uniform distribution of radiant heat over all portions of the area of the incident surface of the body to be treated.

While only two embodiments of the invention have been particularly shown and described, it is distinctly understood that the invention is not limited thereto, but that various modifications may be made in the invention without departing from the spirit and scope thereof, and it is desired therefore that only such limitations shall be placed thereon as are imposed by the prior art and are set forth in the appended claim.

Having thus fully described the invention, I claim:

A radiant heat oven for therapeutic treatment of portions of the human body comprising, casing means formed of a rectangular central section adapted to be suspended over the area to be treated and a pair of lateral rectanguluar sections, each of said sections housing radiant heating means comprising a heat transmitting glass plate of substantially the size of said section disposed with its inner surface in the plane of the inner surface of said section and having means coated over the rear surface thereof operative to generate on electrical energization and uniformly radiate heat from the area subtended by the glass plate inwardly of said casing section, hinge means securing said lateral sections to said central section to permit the inner surfaces of said casing sections to be disposed substantially equidistant from the incident surface of the area of the body to be treated to radiate heat uniformly over said incident surface, a coupling arm secured to each of said lateral sections having a sector extending adjacent a side of said central section formed with an arcuate slot therein centered on said hinge means and extending over the angular range of movement of said lateral sections, and clamping bolts threadedly mounted in the side of said central section and extending through each of said slots operative to manually clamp said coupling arm and its associated lateral section in adjusted angular relation with said central section.

PETER CHARLES DAUGERT.

REFERENCES CITED

The following references are of record in the file of this patent:

UNITED STATES PATENTS

| Number | Name | Date |
|---|---|---|
| 1,204,185 | Perlman | Nov. 7, 1916 |
| 1,492,595 | Edmands | May 6, 1924 |
| 1,530,089 | Perlman | Mar. 17, 1925 |
| 1,638,353 | Maxson | Aug. 9, 1927 |
| 2,119,680 | B. Long | June 7, 1938 |